Jan. 21, 1964     B. E. G. OHLIN     3,118,393
DRIVING MEANS IN A TRACK SYSTEM
Filed Dec. 27, 1961     3 Sheets-Sheet 1
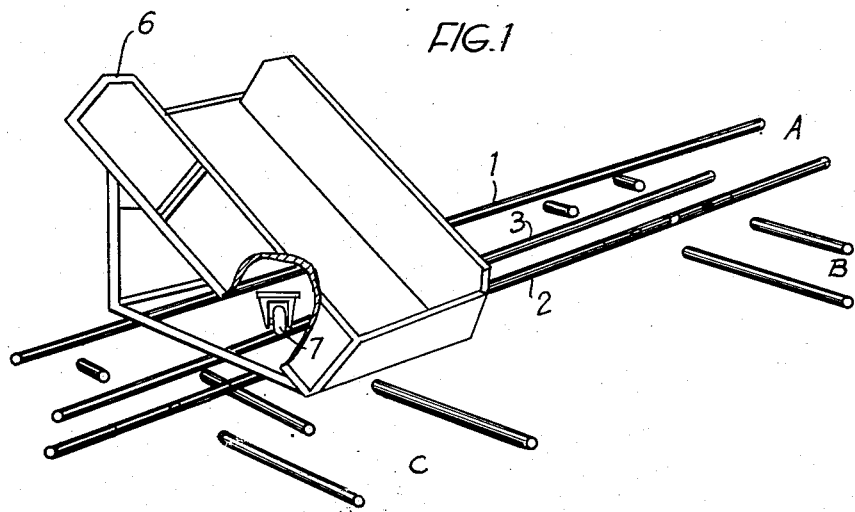

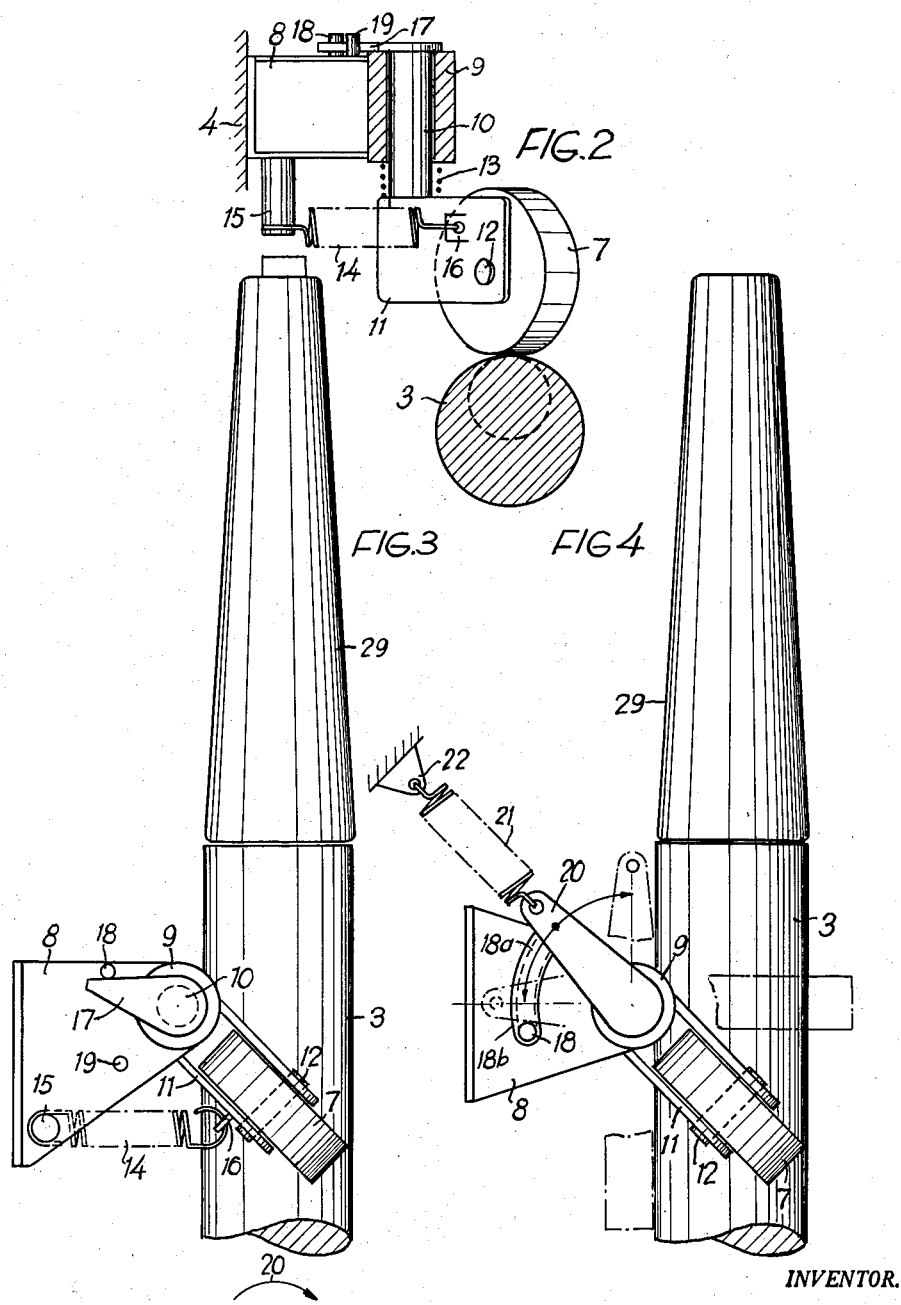

Jan. 21, 1964     B. E. G. OHLIN     3,118,393
DRIVING MEANS IN A TRACK SYSTEM
Filed Dec. 27, 1961     3 Sheets-Sheet 3
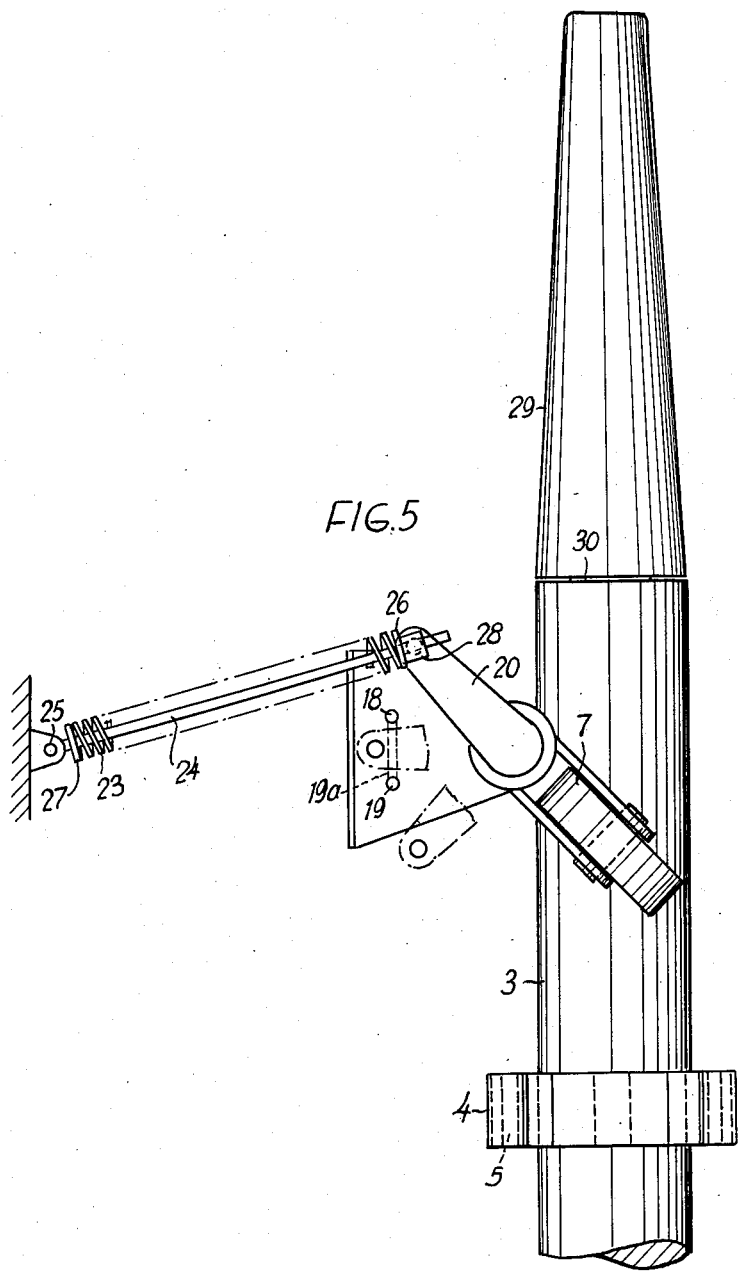
*INVENTOR.*
*BY*

United States Patent Office 3,118,393
Patented Jan. 21, 1964

3,118,393
DRIVING MEANS IN A TRACK SYSTEM
Bror Eric Gustav Ohlin, Alvsjo, Sweden, assignor to AB Transportpatent, Stockholm, Sweden, a corporation of Sweden
Filed Dec. 27, 1961, Ser. No. 162,430
Claims priority, application Sweden Dec. 27, 1960
9 Claims. (Cl. 104—166)

This invention relates to means in a track system for propulsion of vehicles supported on at least one rail forming a track in said track system, and relates especially but not exclusively to means for propulsion of carriages along tracks and branch tracks in conveying plants, as for instance in industries and goods sorting plants.

The object of the invention is to provide driving means of the type stated, by which an arbitrary number of vehicles can be propelled along the tracks without every vehicle having to be provided with a separate complicated driving or coupling device. According to the invention this is accomplished by the driving means including a rotatable driving shaft for each track extending parallel with said rail and a freely rotatable driving wheel on each vehicle, resilient means pressing said driving wheel against said driving shaft in such a position that the axis of rotation of said driving wheel forms an angle with the axis of rotation of said driving shaft.

In plants of the type stated it is convenient if the conveyor line can be constructed so that the sorted goods is placed on carriages intended for predetermined receiving stations, said carriages thereafter being directed on to a main track wherefrom the carriages are shunted on to different branch tracks corresponding to the different receiving stations. When a carriage is shunted on to a branch track, whether this is done with the aid of a turntable, a switch or other convenient means, the carriage must be stopped on the main track, whereby the following carriages also have to be stopped when they reach the stationary carriage. The invention therefore also relates to measures by which the transport movement of one or several carriages can be stopped independently of the remaining carriages. According to the invention this is accomplished by the driving wheel of the carriages being arranged thereon for swinging movement around a pivot extending perpendicularly to the rotation axis of the driving wheel and eccentrically to same, said swinging movement being opposed by resilient means, striving to maintain the axis of rotation of the driving wheel at an angle with the axis of rotation of the driving shaft.

When a carriage is free to move along a track the rotating driving shaft transfers a force to the driving wheel, which force has a component in the direction of transport, which component is large enough to overcome the resistance of the carriage and the load, whereby the force of said resilient means exerted on the wheel is greater than said resistance. The force represented by said component then propels the carriage along the track. However, if the carriage is stopped said component overcomes the force of said resilient means and the driving wheel is swung into a position in which the axis of rotation of the driving wheel is parallel with the rotation axis of the driving shaft, said resilient means at the same time being tightened. In this way the driving wheel is rotating without transferring any driving force to the carriage. When the carriage is released said driving wheel is brought into angular position by said resilient means and the carriage regains its transport movement. The same occurs with a carriage which is stopped by a stationary carriage and a carriage being stopped along a track does thus not only automatically and without shocks interrupt its propelling force but also stops adjacent carriages.

The driving means according to the invention will hereinafter be described with reference to a preferred embodiment in which the track system consists of a main track with branch tracks intersecting the main track at right angles, whereby the shunting of the carriages from the main track onto a branch track is accomplished with the aid of special switch points fully described in U.S. application 77,124, of December 20, 1960, which allow the carriages abruptly to change direction of travel without having to be turned in the new direction of travel. This embodiment does however, not define the limits of the invention as it can be employed with the same advantages in track systems of another construction. Thus the special switch points can be replaced by turntables; the tracks can be formed by one rail; the track system can be intended for overhead trollies and so forth. The scope of the invention is therefore only limited by the contents of the annexed claims.

The schematical drawings show a preferred form of the track system and several embodiments of the driving means. In the drawings:

FIG. 1 shows in perspective a carriage on a part of the track system, part of the carriage being cut away to show the driving means.

FIG. 2 shows in plan view a first embodiment of the driving means in section.

FIG. 3 is a side view of the embodiment in FIG. 2.

FIG. 4 is a second embodiment of the driving means shown in plan view and;

FIG. 5 is a plan view of a third embodiment according to the invention.

As seen in FIG. 1 the track system consists of a main track A and several branch tracks B, C which intersect the main track at right angles. Each track comprises two parallel rails 1 and 2 and a rotatable driving shaft 3 is arranged between and parallel to the two rails 1 and 2 of both main track A and branch tracks B, C. The driving shaft is journalled in U-formed bearing brackets 4 in which the driving shaft is supported for free rotation between three rollers 5, preferably of plastic material. The bearing rollers 5 are spaced at about 120° from each other around the driving shaft 3 so that the top part of the shaft is accessible along all its length.

Each carriage 6 is provided with a freely rotatable driving wheel 7, which is pressed against the top part of the driving shaft 3 by means described below. The axis of rotation of said driving wheel 7 normally forms an angle with the axis of rotation of said driving shaft 3 and rolls against the same, when the driving shaft is rotated by conventional means, for instance an electric motor (not shown). The periphery of the driving wheel is preferably covered with rubber, plastic or a similar friction increasing material. Due to the angle between the rotation axes of the driving wheel and shaft the rotation of the latter produces a pushing force on the driving wheel, which force has a component in the direction of the driving shaft, said component forming the driving force of the carriage. Thus the driving wheel will follow a helical path along the driving shaft.

Several embodiments of the construction of the support for the driving wheel will next be described. The support shown in FIGS. 2 and 3 comprises a bearing support 8, attached to the carriage 6 and carrying a bushing 9. The bushing 9 accommodates a pivot 10 which on the end closest to the driving shaft 3 supports a fork 11 extending outwardly at about right angles to the axis of pivot 10.

A shaft 12 supports the driving wheel 7 for free rotation, the shaft being fastened between the prongs of fork 11. This allows the driving wheel 7 to swing around the axis of pivot 10 which extends eccentrically and perpendicularly to the rotation axis of said driving wheel 7. A helical spring 13 surrounding part of the pivot 10 is arranged between the end of the bushing 9 and the fork 11 and presses the driving wheel 7 resiliently against the driving shaft 3. A helical tension spring 14 has one end fastened to a pin 15 on the bearing support 8 and an opposite end connected to a lug 16 on the fork 11. The spring 14 exerts a force on the fork 11 to bias the axis of rotation of the driving wheel 7 at an angle relative the axis of rotation of the driving shaft, the driving wheel and driving shaft being so oriented that the driving wheel in the angular position thereof contacts the driving shaft along a horizontal tangent thereto.

The free top end of the pivot 10 is rigidly connected to an arm 17, projecting sidewise of the pivot, said arm 17 being swingable together with the driving wheel. Two stop pins 18 and 19 limit the swinging movement so that the driving wheel in one of its end positions occupies the above mentioned angular position and in the other of the end positions has its rotation axis mainly parallel to the rotation axis of the driving shaft.

When the driving shaft 3 rotates in the direction of the arrow as shown in the lower portion of FIG. 2 the driving wheel 7 rolls against the driving shaft, whereby a force acts on the driving wheel 7 in the direction of the shaft, so that the driving wheel is propelled upwardly in FIG. 3. The tension spring 14 is of suitable strength and the lever on which it acts is so selected that the resistance against movement of the carriage and the load carried by same does not overcome the action of said spring 14, wherefore the carriage will travel upwards under the action of the wheel 7 rolling against the shaft 3. However, if the carriage is somehow prevented from moving from some external manifestation, the force acting on the driving wheel 7 from the driving shaft 3 will overcome the restraining tension of the spring 14 and the driving wheel 7 will swing around the pivot 10 until the axis of rotation of the driving wheel occupies a position parallel to the driving shaft. In this position the driving wheel rolls against the driving shaft without skidding or wear of the driving wheel. The stop pin 19 cooperates with the arm 17 to limit the swinging movement of the latter in this direction.

The above described embodiment is mainly intended for use when the carriages are to be stopped during travel in one direction, as the wheel support according to the embodiment cannot function in the described manner if the direction of travel of the carriage is reversed or in all cases when a carriage is to be transferred onto an intersecting track.

This disadvantage is partly overcome by the embodiment of the wheel support shown in FIG. 4. In the following description of alternative embodiments the same reference numerals have been used where possible and a detailed description of elements that fully correspond with the above described device has been omitted.

The driving wheel 7 according to FIG. 4 is journalled for free rotation on the shaft 12 carried by the prongs of the fork 11, said fork being rigidly connected to the pivot 10 which extends perpendicularly and eccentrically to the axis of rotation of the wheel. The pivot 10 is turnably received in the bushing 9 carried by the carriage 6 by means of the bearing support 8. As in the embodiment described above the driving wheel 7 is resiliently urged against the driving shaft 3 by the helical spring 13.

The free end of the pivot 10 is rigidly connected to an arm 20 projecting from the pivot in a direction opposite to the fork 11. In this embodiment the main object of the arm 20 is not to limit the swinging movement of the driving wheel. Instead the arm serves as a lever at the free end of which a helical tension spring 21 is anchored. The opposite end of the spring is fastened to the carriage at a point 22 lying on the extension of the arm 20 when the driving wheel 7 is in predetermined angular position relative the driving shaft. When the driving wheel 7 swings in either direction from said angular position, the tension spring 21 thus acts to return the driving wheel 7 into said angular position. The driving wheel therefore can be swung to both sides of the angular position and into positions in which the rotation axis of the wheel 7 lies parallel with the rotation axis of either of two crossing driving shafts 3. It is thus possible for the driving wheel 7 to occupy an inactive position in all crossing directions of travel of the carriage. If desired, stop members, which for instance co-operate with the arm 20, can be arranged to limit the swinging movement of the driving wheel. As shown, a stop pin 18, co-operating with an arcuate slot 18a in a projection 18b of the arm 20 acts to limit swinging of the wheel in one direction to a position in which the rotation axis of the wheel lies parallel to the shaft 3.

In the drawings the axis of rotation of the driving wheel 7 forms an angle of about 45° with the driving shaft 3 and in FIG. 3 it is swingable to an angle of 0° therewith and in FIG. 4 into angles of 0° and 90° thereto, however, the rotation axis of the wheel 7 may form an angle other than 45°, with the driving shaft 3, and moreover, the driving shafts need not be perpendicular to each other.

If it is desirable to use a transport plant on which one or more carriages are to be propelled back and forth along the track, a modified embodiment can be used, whereby it is possible to stop a carriage with the driving wheel of the same in a neutral position independent of the direction of travel. Such an embodiment will be described with reference to FIG. 5.

The wheel support according to this embodiment corresponds substantially to the embodiment described in FIG. 4, the main difference being that the spring acting on the arm 20 is a helical compression spring 23. Said compression spring 23 surrounds a rod 24 one end of which is swingably connected to a fixed point 25 for instance on the carriage 6. At the other end said rod 24 is slidably arranged in a block 26, which is turnably fastened to the free end of the arm 20. Adjacent fixed point 25 said rod is provided with a washer 27 serving as an abutment for one end of the compression spring 23, the other end of which acts against the block 26 on the arm 20, over another washer 28 which is movable relative the rod.

As long as the movement of the carriage along the track is not prevented, the driving wheel 10 maintains its angular position relative the driving shaft 3, and the carriage is propelled forward. When the travel of the carriage is stopped the driving wheel 7 swings around pivot 10 thereby compressing the spring 23, until it reaches a position in which the rotation axis of wheel 7 is parallel to shaft 3, the propulsion force thereby being eliminated and the driving wheel rendered inactive. If it is desired to reverse the direction of travel of the carriage, the driving wheel 7 is swung, by any convenient means, for instance a lever, until the arm 20 has passed its dead center, the compression spring 23 then forcing the driving wheel to an angular position on the opposite side of the parallel position. Thereafter the carriage 6 is moveable in an opposite direction without reversal of the direction of rotation of the driving shaft. Furthermore, in the reversed direction of movement of the carriage, the latter can be stopped when the driving wheel is swung into a position where the axis of rotation of the wheel 7 is parallel to shaft 3.

In the embodiment according to FIG. 5 it is preferable to limit the swinging movement of the driving wheel 7 by means of stop members. It should be pointed out, that the driving wheel 7 in the different limit positions can form mutually alike or different angles with the driving shaft as desired merely by adjusting the position of the stop members. If the angles are different the propulsion speed of the carriage will be different in opposite directions. To prevent the arm 20 from unintentionally passing the dead center position by the swinging movement of the driving wheel, a stop member can be arranged which is optionally adjustable to arrest the arm 20 just before the wheel 7 reaches a position whereat the axis of rotation thereof lies parallel to the shaft 3. The stop member can for instance have the form of stop pins 18 and 19 adapted for gliding movement in the bearing support 8, the ends of said stop pins being connected by a centrally journalled rockable link 19a. The rocking of the link can be achieved by any convenient means.

The invention furthermore provides for means to retard the travel of a carriage just before it arrives at a position along the track, in which the carriage often is stopped, and to accelerate the travel when this position is passed. This is achieved in a simple way by eliminating the driving shaft at such a position, the ends of the driving shaft ending in sections 29 which are conically tapered. As the pitch of the helical line which the contact point of the driving wheel describes is constant, the distance between two consecutive turns thereof on the tapering sections 29 will successively decrease and thus the rate of travel of the carriage will also decrease successively as the driving wheel moves towards the smaller end of the conical section. Acceleration of the carriage will be obtained when the carriage is travelling in a direction in which the conical section is divergent.

To avoid unnecessary movement of the driving wheel 7 in a direction radially of the driving shaft 3, when the carriage is travelling over the conical sections 29, the driving shaft is constructed such that the conical section 29 is a separate part and is connected at its end of maximum diameter to the end of the driving shaft by a universal joint 30. The smaller end of the conical section 29 is then eccentrically journalled relative to the driving shaft 3 so that a generatrix of the conical surface of the section always forms a straight line with the top of the driving shaft 3 against which the driving wheel 7 is resiliently pressed. Thus the contact point between the driving wheel and the driving shaft will always lie at the same level.

As is evident from above description the driving means according to the invention are in a simple way adaptable to many different applications. The rate of propulsion of the carriages can thus be controlled both by changing the speed of rotation of one or several driving shafts and by changing the angle between the rotation axis of the driving wheel and the driving shaft. The driving means have constant characteristics even if the direction of travel is abruptly changed without the carriage being turned in the new direction of travel. It is of advantage that the driving means automatically and without shocks is brought into a neutral position if the carriage contacts an obstacle and is stopped thereby.

As already pointed out the different embodiments can be modified in many ways. The resilient means resisting the swinging movement of the driving wheel can be constructed in many ways, the main feature being that the driving wheel in said angular position is biased by a force that increases when the driving wheel is swung out of said angular position.

Finally it is pointed out that it is possible to combine the different embodiments. This can for instance be obtained by the pivot 10 carrying two arms 20 according to FIGS. 4 and 5, respectively, each being provided with its own resilient means, said arms being swingably mounted on the pivot and lockable to the same. Thus driving means is provided by which a carriage can be propelled in any of several directions along tracks crossing each other, said driving means showing all the stated advantages and characteristics in all directions of travel.

What is claimed is:

1. In a track system constituted by a plurality of intersecting tracks each of which includes a rail, the track system being effective to movably support a vehicle thereon, the provision of driving means for advancing the vehicle along said track system, said means comprising: a shaft in each track extending substantially parallel to the rail thereof and adapted for being driven in rotation about the central axis thereof, a freely rotatable driving wheel for said vehicle, means supporting said wheel from said vehicle in resilient contact with the shaft when the vehicle is supported on one of said tracks, the latter means including means supporting the wheel for swinging movement relative to the vehicle about an axis eccentric and substantially perpendicular to that of said shaft, and resilient means urging the wheel to an angular position with respect to the shaft, said wheel being effective when in contact with said shaft and at an angle thereto to drive said vehicle under the action of rotation of said shaft, said means supporting the wheel for swinging movement being operative to permit automatic swinging of the wheel against the action of the resilient means to a position whereat the wheel lies in a transverse plane extending perpendicular to the axis of the shaft when the vehicle meets an obstacle and is stopped thereby.

2. In a track system having a plurality of intersecting tracks each of which is provided with a rail, means for driving a vehicle on said tracks, said means comprising: a driving shaft for each track extending substantially parallel to the rail thereof, each driving shaft being adapted for rotation about a central axis thereof, a driving wheel supported on said vehicle for free rotation about an axis, means for resiliently urging the driving wheel into contact with the driving shaft corresponding to the track on which the vehicle is to be advanced, a pivot supporting the driving wheel for swinging movement about an axis which is both eccentric and perpendicular to the axis of rotation of the latter said driving shaft and the axis of rotation of the drive wheel; and resilient means for urging the driving wheel to a position whereat the axis of rotation of the driving wheel is inclined with respect to the axis of rotation of said latter shaft, said driving wheel swinging when said vehicle is blocked for movement, under the influence of the rotation of said latter drive shaft, and against the action of said resilient means to a position whereat the axis of rotation of the drive wheel extends parallel to the axis of rotation of the drive shaft.

3. In a track system having a plurality of intersecting tracks each of which is provided with a rail, means for driving a vehicle on said tracks, said means comprising: a driving shaft for each track extending substantially parallel to the rail thereof, each driving shaft being adapted for rotation about a central axis thereof, a driving wheel supported on said vehicle for free rotation about an axis, means for resiliently urging the driving wheel into contact with the driving shaft corresponding to the track on which the vehicle is to be advanced, a pivot supporting the driving wheel for swinging movement about an axis which is both eccentric and perpendicular to the axis of rotation of the latter said driving shaft and the axis of rotation of the drive wheel; and resilient means for urging the drive wheel to a position whereat the axis of rotation of the driving wheel is inclined with respect to the axis of rotation of said latter shaft whereby said vehicle is advanced in a direction parallel to said latter shaft, said resilient means being of sufficient strength to maintain said drive wheel inclined with respect to said latter shaft upon normal advancement of said vehicle, but automatically permitting swinging of the driving wheel about said pivot to a position whereat the axis of rotation of the drive wheel is parallel to the axis of rotation of said latter drive shaft when said vehicle is blocked for movement.

4. A track system as claimed in claim 3 comprising means constituting stops for said wheel to allow swinging movement of said wheel only between a first position corresponding to the inclined position of the wheel with respect to the drive shaft and a second position corresponding to the position whereat the axis of rotation of the drive wheel and shaft are parallel.

5. A track system as claimed in claim 3 comprising means constituting stops for said wheel to allow swinging movement of said wheel in opposite directions of angular travel from the inclined position of the wheel with respect to the shaft to positions whereat the wheel is respectively parallel to drive shafts of tracks respectively intersecting the first said tracks.

6. A track system as claimed in claim 3 comprising means constituting stops for said wheel to allow swinging movement of said wheel from a first position corresponding to the inclined position of the wheel with respect to the drive shaft through a position whereat the axis of the wheel lies parallel to the axis of the shaft to a second position whereat the wheel once again forms an angle with respect to the axis of the drive shaft.

7. A track system as claimed in claim 3 wherein said resilient means comprises a helical spring.

8. A track system as claimed in claim 3 comprising a conically tapered end section on at least one of said drive shafts.

9. A track system as claimed in claim 3 comprising a conically tapered section, and universal joint means connecting said conically tapered section at the end of larger diameter thereof to one of the drive shafts in coaxial relation, whereby the end of said conically tapered section of smaller diameter can be supported eccentrically of the axis of rotation of said one drive shaft so that a straight line may be drawn along a surface of the conically tapered section and a surface of said one drive shaft.

References Cited in the file of this patent

UNITED STATES PATENTS

| | | |
|---|---|---|
| 402,933 | Judson | May 7, 1889 |
| 908,943 | Brannon | Jan. 5, 1909 |
| 1,298,285 | Bogaty | Mar. 25, 1919 |